J. J. SINGER.
ILLUMINATING DEVICE FOR TRANSPARENT PICTURES AND PHOTOGRAPHIC NEGATIVES.
APPLICATION FILED FEB. 16, 1918.
1,272,547.
Patented July 16, 1918.
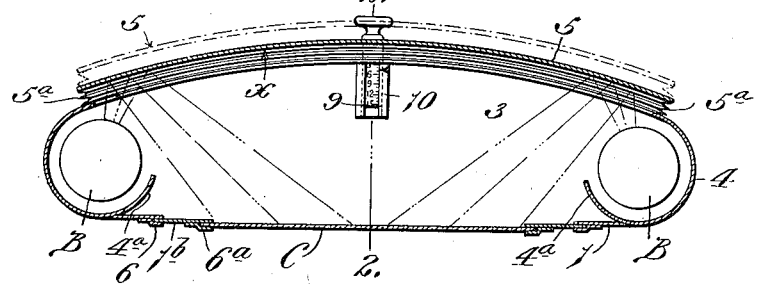
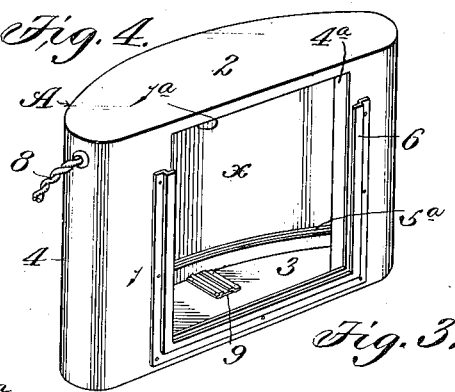
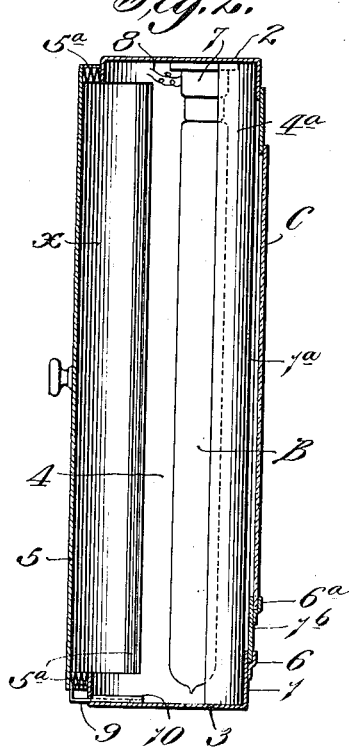
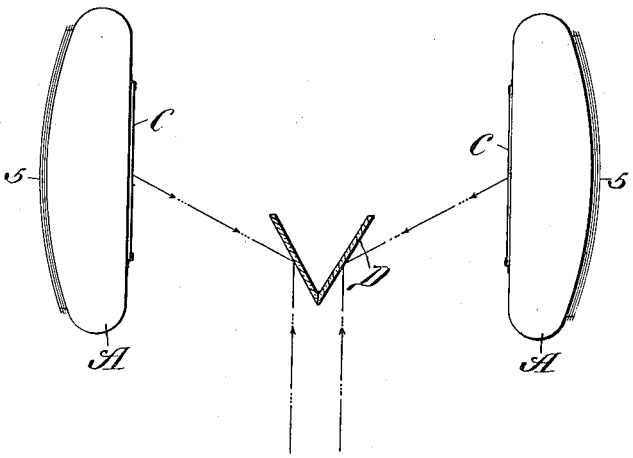
Inventor,
Jacob J. Singer.
By Bakewell & Church, Attys.

UNITED STATES PATENT OFFICE.

JACOB J. SINGER, OF ST. LOUIS, MISSOURI.

ILLUMINATING DEVICE FOR TRANSPARENT PICTURES AND PHOTOGRAPHIC NEGATIVES.

1,272,547.

Specification of Letters Patent.  Patented July 16, 1918.

Application filed February 16, 1918.  Serial No. 217,516.

*To all whom it may concern:*

Be it known that I, JACOB J. SINGER, a citizen of the United States, residing at St. Louis, Missouri, have invented a certain new and useful Improvement in Illuminating Devices for Transparent Pictures and Photographic Negatives, of which the following is a full, clear, and exact description, such as will enable others skilled in the art to which it appertains to make and use the same.

This invention relates to a device that is adapted to be used for illuminating a transparent picture and also for projecting light through a photographic negative during the operation of making a positive from the negative.

The main object of my invention is to provide a device of the character referred to which will project light onto a transparent picture or negative in such a manner that the subject or object in the picture or negative will present substantially the same appearance as the original subject, so far as the curvature and relative location of the component parts of the original subject are concerned. In other words, the chief object of my invention is to provide an illuminating device for the purpose described, which is so constructed that the subject of the transparent picture or negative or the objects represented in same will "stand out" from the background and will present substantially the same appearance as the original subject presents when viewed by the naked eye. Other objects and desirable features of my invention will be hereinafter pointed out.

To this end I have devised an illuminating device that consists of a housing or casing having an opening in one of its walls in which or over which a transparent picture or negative can be arranged, a concaved, smooth reflecting surface arranged in said housing behind said opening and lighting units arranged in said housing in such a position with relation to said reflecting surface that light rays from said lighting units will strike said reflecting surface and be projected forwardly from same through the picture or negative in such a manner that the rays will diminish gradually in intensity from the outer edges of the picture or negative toward the center of same, thereby producing an illuminating effect which causes the objects represented in the picture or negative to present substantially the same appearance as the original presents when viewed by the naked eye.

Figure 1 of the drawings is a horizontal sectional view of an illuminating device constructed in accordance with my invention.

Fig. 2 is a vertical sectional view, taken on the line 2—2 of Fig. 1.

Fig. 3 is a diagrammatic view, showing two of my improved illuminating devices combined with mirrors so as to produce a stereoscope; and Fig. 4 is a perspective view of my improved illuminating device.

I have herein illustrated my invention embodied in a device that is intended to be used primarily for illuminating an X-ray plate during the operation of viewing or examining said plate, but it can also be used for exhibiting any kind of a transparent picture or for projecting light through a photographic negative during the operation of making a positive or a photographic print of the negative. When used for exhibiting or illuminating an X-ray plate its value and efficiency in comparison with the ordinary X-ray plate illuminator is most obvious, owing to the fact that the ordinary X-ray plate illuminator produces light of a different character than the light used to produce an X-ray plate, whereas, my device produces light of substantially the same character as the light used in producing an X-ray plate. An X-ray plate represents in black and white the obstruction to the X-rays as they penetrate the body of the subject of which the X-ray is being taken. Consequently, an X-ray plate represents an uneven distribution of light rays caused by the varying densities through which the X-rays must travel. Therefore, in exhibiting an X-ray plate it is desirable that the plate be illuminated by uneven light, or, in other words, by light of substantially the same character as the light by which the X-ray plate was produced. The ordinary X-ray plate illuminator will not do this, because it comprises a flat ground glass plate arranged directly in front of lighting units in such a manner that the rays of light projected through the X-ray plate are of equal intensity. My improved device, however, is so constructed that it produces light rays of unequal intensity and of substantially the same character as the light used to produce an X-ray plate. Consequently, when an X-ray plate is exhibited in my device the subject of the X-ray will stand out and present substantially the same appearance as the original subject. If, for example, the subject of the X-ray consists of the bones in the trunk of a human body, the bones at the front of the body will appear to be positioned some distance in front of the bones at the back of the body, and those bones that are curved will appear to be curved. The ordinary X-ray plate illuminator will not do this. In fact, an X-ray plate of the character referred to, when exhibited in an ordinary X-ray plate illuminator, will look perfectly flat, and the front and back bones will appear to be superimposed directly upon each other with no intervening space between them. I do not wish it to be understood, however, that my invention is limited to an illuminating device of the particular character herein illustrated and described, as my broad idea is applicable to illuminating devices used for various other purposes.

Referring to the drawings which illustrate one form of my invention, A designates a casing or housing formed of sheet material or any other suitable material and provided with a front wall 1, top and bottom walls 2 and 3, respectively, end walls 4 and a smooth rear wall 5. In the form of my invention herein shown the rear wall 5 is concaved in horizontal section and the inner side of same is used to form a smooth reflecting surface $x$. The end walls 4 of the casing are preferably curved or of segmental shape in horizontal section, as shown in Fig. 1, and two lighting units B are arranged inside of the casing in proximity to said end walls. The front wall 1 of the casing is provided with an opening $1^a$ in which or over which a transparent picture or photographic negative C can be arranged. Any suitable means can be used for sustaining said picture or negative in operative position, such for example, as a grooved guide 6 on the front wall of the casing in which the picture or negative can be positioned.

When the device is in use the direct rays from the lighting units B strike the reflecting surface $x$ and are thence projected forwardly from said reflecting surface through the picture or negative C. In view of the fact that the reflecting surface $x$ is concaved and smooth, the rays of light that are projected forwardly from same through the picture or negative will be of varying length and of unequal intensity, the long rays which strike the center portion of the picture or negative being much weaker or of less intensity than the short rays which strike the side edge portions of the picture or negative. Consequently, the picture or negative will be illuminated unevenly, and accordingly, the subject or the objects represented in the picture or negative will stand out from the background and the component parts of the subject will present substantially the same appearance as when the original is viewed by the naked eye.

If desired, the end walls of the casing A can be provided with extensions or shields $4^a$ which are so proportioned that no direct rays from the lighting units B will strike the picture or negative being exhibited. Any suitable type of lighting units can be used, but I prefer to equip the device with incandescent electric lamps that are mounted in electrical receptacles 7 in the casing which are electrically connected with a supply wire 8 that is led into the casing through a hole in one of the walls of same. The reflecting surface $x$ can either be formed by the rear wall of the casing or by a separate reflecting member, and said rear wall can either be rigidly connected to the end walls of the casing or constructed in such a manner that it can be adjusted toward and away from the lighting units so as to vary the intensity of the light produced, either to suit the particular picture or negative being exhibited or to accommodate the device to the eyes of the person looking at the picture or negative. This can be accomplished in various ways without departing from the spirit of my invention, but one convenient way of constructing the device is to provide the rear wall 5 of same with a flexible accordion portion $5^a$ that permits said rear wall to be adjusted toward and away from the lighting units, as indicated in broken lines in Fig. 1. If desired, the device can be provided with means to assist the user in adjusting the back 5 in proper position, the means herein shown for this purpose consisting of a graduated scale 9 secured to the lower edge portion of the back 5 and slidingly mounted in a stationary guideway 10 on the bottom wall 3 of the casing.

In order that pictures or negatives of various sizes may be used in the device I have provided the front wall of the casing with a removable portion $1^b$ consisting of a frame that can be positioned in the grooved guide 6 and equipped with a grooved guide $6^a$ that is adapted to hold a picture or negative of smaller dimensions than the opening $1^a$ in the front wall of the casing.

In Fig. 3 I have shown two of my improved illuminating devices used in conjunction with mirrors D so as to produce a stereoscope.

Having thus described my invention, what I claim, and desire to secure by Letters Patent, is:

1. An illuminating device, comprising means for sustaining a transparent picture or negative in operative position, a source of light and a smooth reflecting surface arranged in proximity to said picture or negative and so positioned with relation to each other that the picture or negative will be illuminated by reflected rays of light that diminish gradually in intensity toward the center of the picture, and means for changing the relative position of said reflecting surface and source of light so as to vary the intensity of said light rays.

2. An illuminating device for the purpose described, comprising a housing provided with an opening in which a transparent picture or negative can be arranged, lighting units arranged in said housing adjacent the opposite side edges of said opening, a concaved reflecting surface arranged inside of said housing behind said lighting units with its vertical axis midway between said lighting units, and means for enabling the relative position of said reflecting surface and lighting units to be changed so as to vary the intensity of said light rays.

3. An illuminating device for the purpose described, comprising a housing having an opening in its front wall in which a transparent picture or negative can be arranged, an adjustable rear wall whose inner side serves as a smooth, concaved reflecting surface, and lighting units arranged inside of said housing between said front and rear walls, and on opposite sides of the opening in the front wall.

4. An illuminating device for the purpose described, comprising a housing or casing having a front wall provided with an opening and a curved rear wall whose inner side serves as a concaved reflecting surface, the housing being provided with a flexible accordion portion that carries said rear wall, and lighting units arranged inside of said housing in such a position with relation to said reflecting surface that reflected rays of light of unequal intensity will be projected forwardly through the opening in the front wall of said housing.

5. An illuminating device for the purpose described, comprising a housing or casing having a front wall provided with an opening and a curved rear wall whose inner side serves as a concaved reflecting surface, the housing being provided with a flexible accordion portion that carries said rear wall, lighting units arranged inside of said housing in such a position with relation to said reflecting surface that reflected rays of light of unequal intensity will be projected forwardly through the opening in the front wall of said housing, and means for assisting the user in properly adjusting the rear wall of said housing.

JACOB J. SINGER.